US011074071B1

(12) United States Patent
Miller et al.

(10) Patent No.: US 11,074,071 B1
(45) Date of Patent: Jul. 27, 2021

(54) EMULATION OF AN ENVIRONMENT SET BY A SOURCED SCRIPT WRITTEN IN A DIFFERENT SCRIPTING LANGUAGE

(71) Applicant: International Business Machines Corporation, Armonk, NY (US)

(72) Inventors: Scott Miller, Poughkeepsie, NY (US); Mark Allen, Dallas, TX (US); Austen William Lauria, Fishkill, NY (US); William P. LePera, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/741,300

(22) Filed: Jan. 13, 2020

(51) Int. Cl.
*G06F 9/44* (2018.01)
*G06F 8/76* (2018.01)
*G06F 8/41* (2018.01)
*G06F 8/51* (2018.01)
*G06F 9/455* (2018.01)

(52) U.S. Cl.
CPC .................. *G06F 8/76* (2013.01); *G06F 8/42* (2013.01); *G06F 8/51* (2013.01); *G06F 9/45512* (2013.01)

(58) Field of Classification Search
None
See application file for complete search history.

(56) References Cited

U.S. PATENT DOCUMENTS

| 6,681,386 | B1 | 1/2004 | Amin et al. |
| 6,904,424 | B1 * | 6/2005 | Gusler ................ G06F 9/45512 |
| 7,003,765 | B1 | 2/2006 | Venkatasubramanian et al. |
| 9,710,370 | B2 * | 7/2017 | Bosschaert ......... G06F 11/3688 |
| 10,108,533 | B1 | 10/2018 | Parasuraman et al. |
| 10,331,897 | B2 * | 6/2019 | Zhang ..................... G06F 8/44 |
| 2014/0075322 | A1 | 3/2014 | Delano |
| 2014/0359258 | A1 | 12/2014 | Snover et al. |
| 2014/0379322 | A1 | 12/2014 | Koutrika et al. |
| 2018/0089428 | A1 | 3/2018 | Green et al. |

(Continued)

OTHER PUBLICATIONS

Mazurak et al., ABASH: Finding Bugs in Bash Scripts, PLAS'07 ACM SIGPLAN Workshop on, Jun. 14, 2007, pp. 105-114.

(Continued)

*Primary Examiner* — Qamrun Nahar
(74) *Attorney, Agent, or Firm* — Garg Law Firm, PLLC; Rakesh Garg; David Quinn (57) ABSTRACT

An embodiment includes storing original environment data in a memory of a computing device, then sourcing a script in a child command shell that includes an environment variable set-up command for setting an environmental characteristic of a new computing environment associated with the child command shell. The new environment data is also stored in the memory of the computing device that defines the new computing environment associated with the child command shell. The original computing environment is then restored by terminating the child command shell and returning to the target command shell. The original environment data is compared to the new environment data to determine the differences between the two environments, and the original computing environment is then modified to match the new computing environment created by the sourced script.

20 Claims, 4 Drawing Sheets

(56) References Cited

U.S. PATENT DOCUMENTS

2019/0012161 A1   1/2019  Miernik
2019/0114059 A1*  4/2019  Chakra ..................... G06F 8/38
2019/0188015 A1   6/2019  Sukhyani et al.

OTHER PUBLICATIONS

Liu, et al., Natural Shell: An Assistant for End-User Scripting, International Journal of People-Oriented Programming Jan. 2016-Jun. 2016, vol. 5 • Issue 1.
Walker et al., Composing and Executing Parallel Data-flow Graphs with Shell Pipes, Works'09 4th ACM Workshop on, Nov. 16, 2009, Article 11, pp. 1-10.
Moore et al., SHILL: A Secure Shell Scripting Language, OSDI'14 11th USENIX ACM SIGOPS Conference on, Oct. 6, 2014-Oct. 8, 2014, pp. 183-199.
Stackoverflow, How to source a csh script in bash to set the environment, May 2010, https://stackoverflow.com/questions/2710790/how-to-source-a-csh-script-in-bash-to-set-the-environment.

* cited by examiner

EMULATION OF AN ENVIRONMENT SET BY A SOURCED SCRIPT WRITTEN IN A DIFFERENT SCRIPTING LANGUAGE

TECHNICAL FIELD

The present invention relates generally to a method, system, and computer program product for computing environment management. More particularly, the present invention relates to a method, system, and computer program product for emulation of an environment set by a source script written in a different scripting language.

BACKGROUND

A shell is a computer program that provides an interface between a user and an operating system. For example, a user can input commands to a shell in order to perform tasks related to managing files, managing processes, and starting or stopping programs on a computer system. One way users can input commands is through the use of a command prompt, which allows a user to input text commands to the shell. A user can also create a file containing a group of text commands for the shell to execute, which is referred to as a shell script. Shell scripts are useful for grouping commonly run commands, allowing a user to run a single script rather than the more time-consuming process of inputting the string of commands contained within the script.

An example of a common use for a shell script is to set up or modify a computing environment. When a user boots up a computer, the operating system performs a series of start-up tasks, including configuring environment settings for the computer to provide the user with a specific computing environment. The environment settings include settings to control such things as desktop layout, security settings, and other device configurations. A user can make changes to the environment by changing key:value pairs in the form of environment variables stored in the operating system. Rather than perform the time-consuming process of inputting individual commands to change each of these values, it is much more efficient and convenient to create an environment script that includes all of the desired environment changes so they can all be made by simply running one script instead of a long list of individual commands.

SUMMARY

The illustrative embodiments provide for emulation of an environment set by a sourced script written in a different scripting language. An embodiment includes storing original environment data in a memory of a computing device, the original environment data defining an original computing environment associated with a target command shell. The embodiment also includes executing a script in a child command shell that includes an environment variable set-up command for setting an environmental characteristic of a new computing environment associated with the child command shell. The embodiment also includes storing new environment data in the memory of the computing device, the new environment data defining the new computing environment associated with the child command shell. The embodiment also includes restoring the original computing environment by terminating the child command shell and returning to the target command shell. The embodiment also includes generating new data representative of comparison results from comparing the original environment data to the new environment data to derive characteristics of the new computing environment that differ from the original computing environment. The embodiment also includes modifying the original computing environment to include the characteristics of the new computing environment that differ from the original computing environment. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The use of shell scripts has become commonplace due to the convenience and efficiency it offers. However, today there are many different shells for the Unix/Linux family of operating systems. These shells have many similarities, but also have some differences, including differences in syntax and commands used for shell scripts. Because of this, a shell script written to run under one type of shell may not run under another type of shell. For example, a shell script written to run under the Bourne Again Shell (bash), may not run properly if a user tries to run the script in a C Shell. To generate run-time and build-time environments, it is common for a user to source a shell script to set environment variables, modify files and folders, and perform other actions. However, a problem arises because shell scripts may be written in a multitude of different shell languages and there is no easy way to port a shell script to another language. If a user sources a child shell to run the shell script in its native shell, the environment will only be temporarily set, because once the sourced shell is terminated, the environment reverts back to the environment that was in place under the parent shell. This makes automation and integration projects complex and difficult to automate.

The illustrative embodiments used to describe the invention generally address and solve the above-described problem of a lack of compatibility and portability for shell scripts across all of the various available shells. The illustrative embodiments recognize that the scripting language used to create an environment script may not run properly under different shells. The illustrative embodiments also recognize that different shells have different characteristics, making some shells more useful for certain situations or more preferable for some users for certain tasks or based on personal preferences. The illustrative embodiments recognize the need to provide an efficient and simple way to set an environment using a shell script written in any shell language and maintain that environment under any other shell.

The illustrative embodiments used to describe the invention generally address and solve the above-described problems and other problems related to solving language barriers or compatibility problems in shell scripts. The illustrative embodiments provide a method, system, and computer program product for emulation of an environment in a shell set by a source script written in a different scripting language to run under a different shell.

An embodiment evaluates an environment created by a shell script run under a different shell to identify changes to the environment made to the environment by the shell script. When a computer system changes from the shell that ran the script to a different shell and a corresponding different environment, an embodiment emulates the shell script by making the identified changes to match the current environment to the environment created by the shell script.

An embodiment running a user's preferred shell, referred to hereinafter as the target shell, is running under an initial or original computing environment, and sources a script under a child shell that is a different type of shell and that creates a revised environment under the child shell. An embodiment saves environment information in memory before terminating the child shell. When the child shell terminates, the computing system automatically reverts to the target shell and to the original computing environment. An embodiment then emulates the revised environment set by the child shell by using the environment information stored in memory to identify and make changes to match the current environment to the environment created by the child shell.

An embodiment running a target shell under an original computing environment sources a shell script written to run under a different type of shell and runs the shell script under its native shell. In an embodiment, the shell script includes an environment variable set-up command for setting an environment characteristic of a new computing environment. An embodiment saves environment information in memory including environment information representative of the environment characteristic set by the shell script. In an embodiment, after the native shell terminates, the computing system automatically reverts to the target shell and to the original computing environment. An embodiment then emulates the revised environment based on the environment information saved in memory, including the environment information representative of the environment characteristic set by the shell script.

An embodiment running a target shell under an original computing environment sources a shell script under its native shell. In an embodiment, the shell script includes an environment variable set-up command for setting an environment characteristic of a new computing environment. An embodiment stores new environment data in the memory of the computing device, where the new environment data defines the new computing environment associated with the child command shell. An embodiment restores the original computing environment by terminating the child command shell and returns to the target command shell. An embodiment then emulates the revised environment based on the new environment information stored in memory.

An embodiment running a target shell under an original computing environment stores original environment data in the memory of the computing device, where the original environment data includes a first array of key:value pairs of original environment variables that defines the original computing environment associated with the target command shell. An embodiment sources a shell script under its native shell that creates a revised computing environment. An embodiment stores new environment data in the memory of the computing device, where the new environment data includes a second array of key:value pairs of new environment variables that defines the new computing environment associated with the revised computing environment. An embodiment restores the original computing environment by terminating the child command shell and returns to the target command shell. An embodiment then generates the new data representative of comparison results from iterating through key:value pairs in the first and second arrays to detect how the new computing environment differs from the original computing environment. An embodiment then modifies the computing environment to include the characteristics of the new computing environment that differ from the original computing environment.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
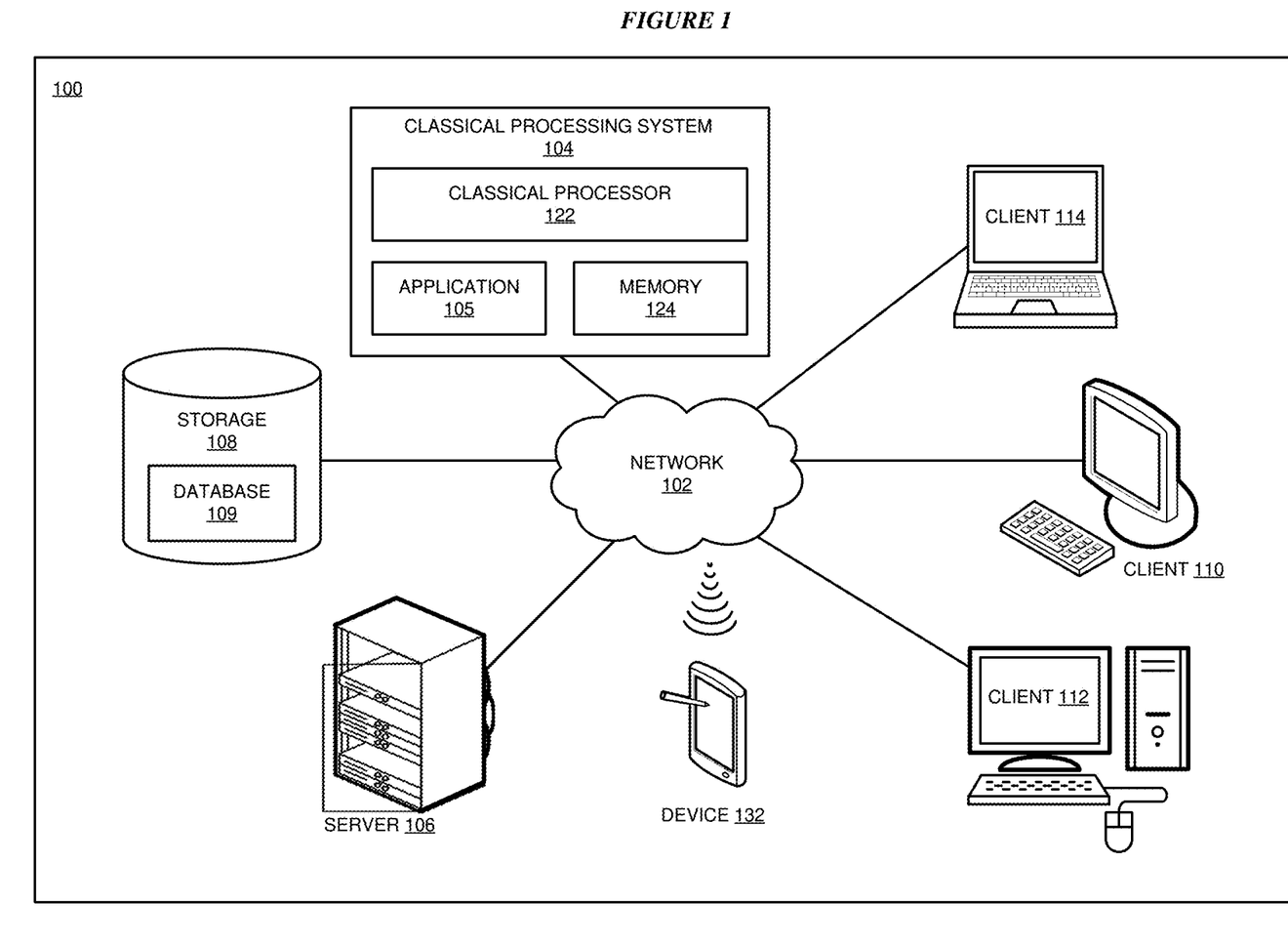
FIG. 1 depicts a block diagram of a network of data processing systems in which illustrative embodiments may be implemented.
Figure 2:
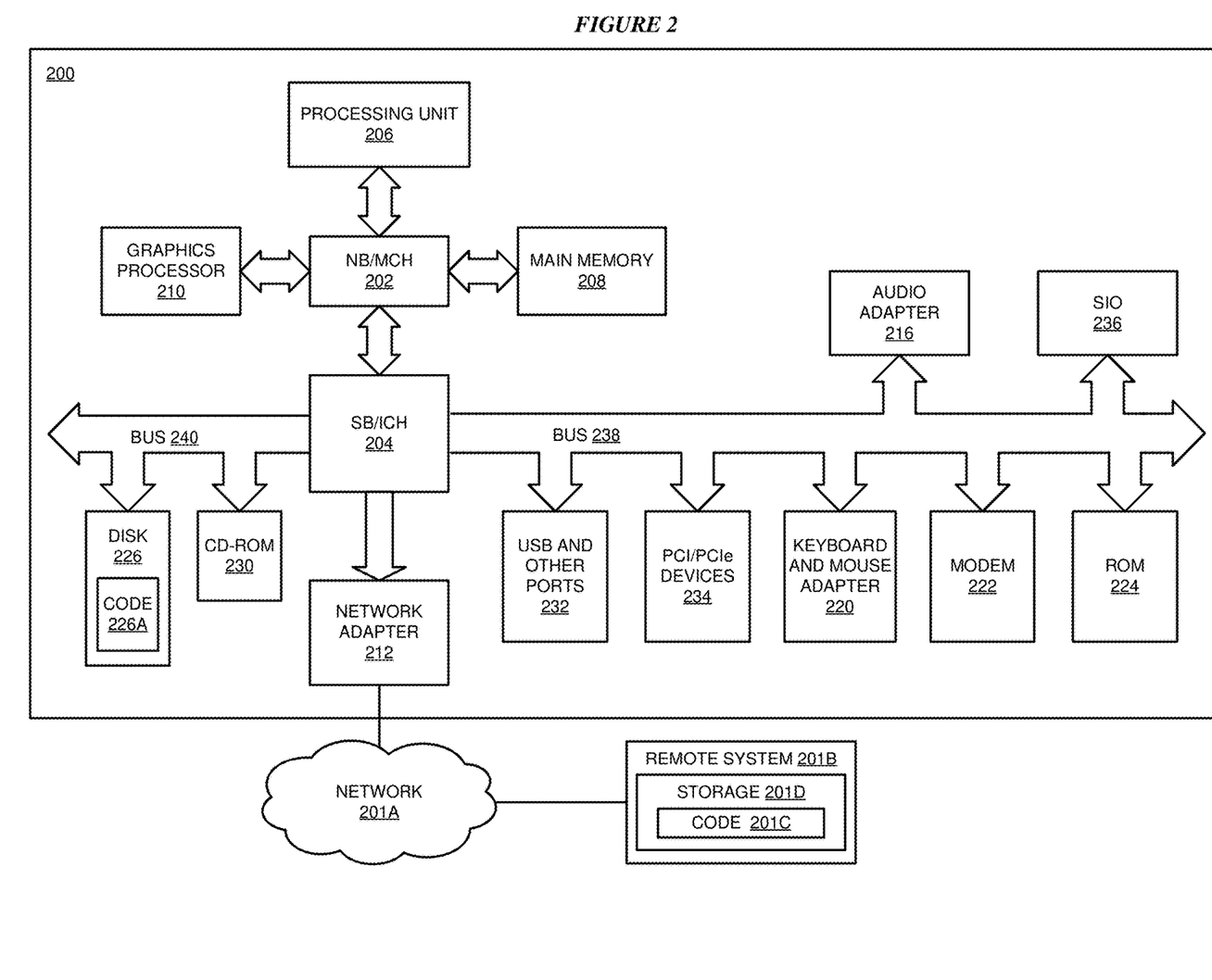
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105 that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
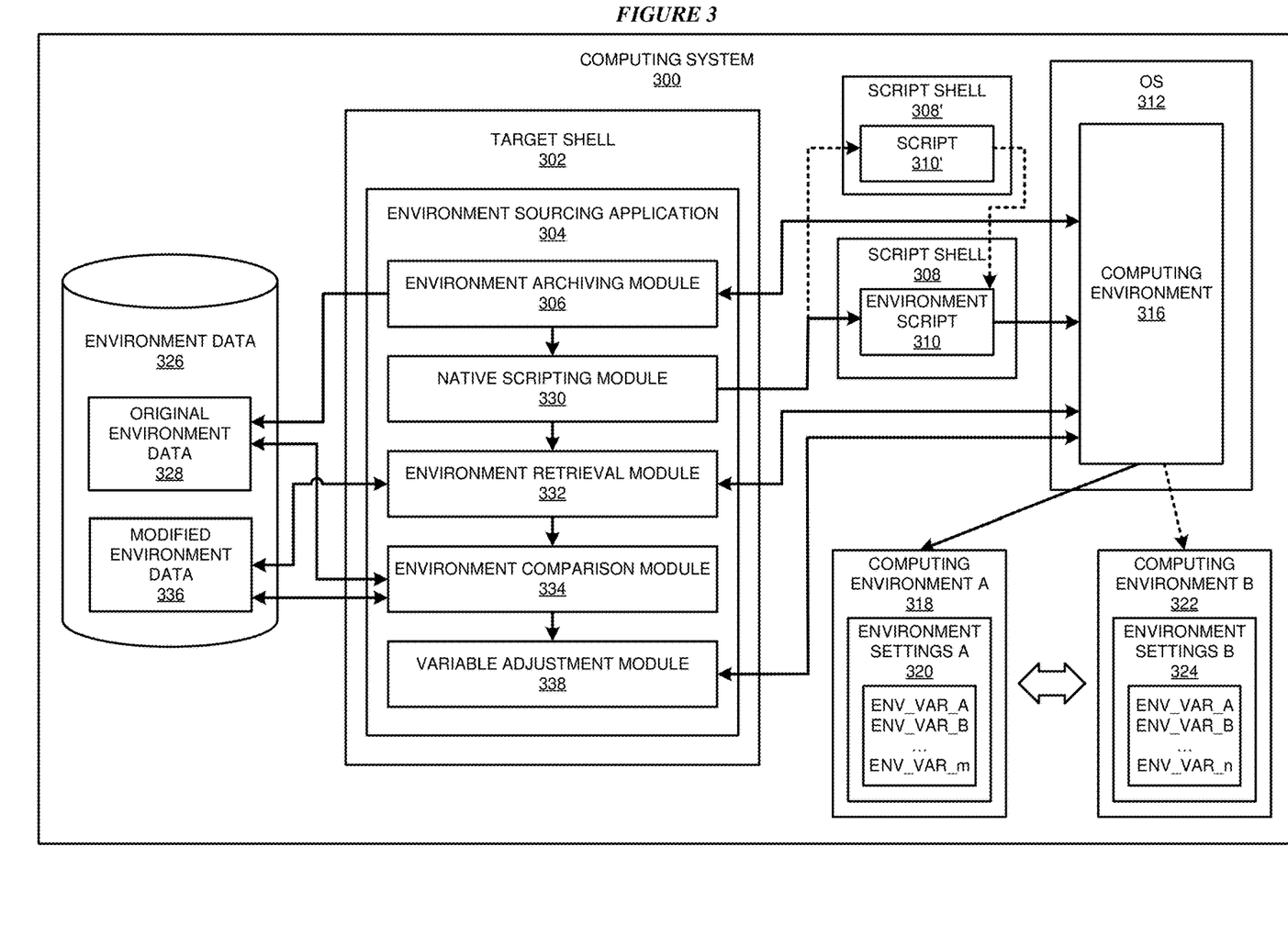
FIG. 3 depicts a block diagram of an example computing system for an environment sourcing application in accordance with an illustrative embodiment.

With reference to FIG. 3, this figure depicts a block diagram of an example computing system 300 in accordance with an illustrative embodiment. The example embodiment includes an environment sourcing application 304. In a particular embodiment, application 304 is an example of application 105 of FIG. 1.

In some embodiments, the environment sourcing application 304 runs in a target shell 302. In some embodiments, the target shell 302 is the user's default shell or desired execution shell, and takes the form of either an automated script or an interactive user shell session. In some embodiments, the environment sourcing application 304 includes an environment archiving module 306, a native scripting module 330, an environment retrieval module 332, an environment comparison module 334, and a variable adjustment module 338. In alternative embodiments, the environment sourcing application 304 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, environment archiving module 306 retrieves current environment definition information from computing environment 316 of the operating system (OS) 312, and stores the current environment definition information as original environment data 328 in a memory, such as environment data memory 326, of the computing device 300. In some embodiments, original environment data 326 includes data that defines an original computing environment associated with the target command shell. For example, in some embodiments, the original computing environment is shown as computing environment A 318, which includes environment settings A 320 and includes environment variables ENV_VAR_A through ENV_VAR_m where m is an integer representative of the total number of environment variables in the original computing environment data. In some embodiments, the original computing environment 322 is a default environment initiated by the OS 312, for example when the computing system 300 is starting up or when a user logs in. In some embodiments, the original environment data 328 includes various environment variables and options as key:value pairs that are available to applications running under the OS 312, for example, information about the types and locations of system resources; the state of the runtime environment; the operating system and other software; and user settings.

In some embodiments, the environment archiving module 306 stores environment definition information in a text file as part of the original environment data 328 in the memory 326. For example, in some embodiments, the environment archiving module 306 is running on a UNIX or Linux operating system and stores environment definition information that is output from the shell command env( ) in a text file as part of the original environment data 328 in the memory 326. In some embodiments, the environment archiving module 306 copies key:value pairs from the environment definition information and stores them in an original environment array, for example in a hash table, as part of the original environment data 328 in the memory 326.

In some embodiments, the native scripting module 330 runs a script, shown as environment script 310, that is written in a scripting language that is not compatible with the target shell, and therefore needs to be sourced under the script's native shell, shown as script shell 308, where the script shell 308 and the target shell 302 are different types of shells. As a non-limiting example, in some embodiments, the target shell 302 is a Bourne-Again shell (bash), whereas the script shell 308 is a C shell (csh). In some embodiments, the native scripting module 330 launches the script shell 308 as a child command shell and executes the environment script 310 in the child command shell. In some embodiments, the environment script 310 sets environment variables, modifies files and/or folders, and may perform other actions that create a new computing environment 316. For example, in some embodiments, the new computing environment 316 is shown as computing environment B 322, which includes environment settings B 324 and includes environment variables ENV_VAR_A through ENV_VAR_n where n is an integer representative of the total number of environment variables in the new computing environment data. In some embodiments, the total number of environment variables n in the new computing environment data is equal to the total number of environment variables m in the original computing environment data; in some embodiments, the total number of environment variables n in the new computing environment data is greater than or less than the total number of environment variables m in the original computing environment data.

In some embodiments, the environment retrieval module 332 retrieves the new environment definition information for the new computing environment 322 generated by the environment script 310 from computing environment 316 of the operating system (OS) 312, and stores the new environment definition information as modified environment data 336 in the environment data memory 326, of the computing device 300. In some embodiments, the modified environment data 336 includes various environment variables and options as key:value pairs that are available to applications running under the OS 312, for example, information about the types and locations of system resources; the state of the runtime environment; the operating system and other software; and user settings.

In some embodiments, the environment retrieval module 332 stores the new environment definition information in a text file as part of the modified environment data 336 in the memory 326. For example, in some embodiments, the environment retrieval module 332 is running on a UNIX or Linux operating system and stores environment definition information that is output from the shell command env( ) in a text file as part of the modified environment data 336 in the memory 326. In some embodiments, the environment retrieval module 332 copies key:value pairs from the new environment definition information and stores them in a new environment array, for example in a hash table, as part of the modified environment data 336 in the memory 326.

In some embodiments, the script shell 308 is terminated at some point after the environment retrieval module 332 retrieves the new environment definition information generated by the environment script 310 from computing environment 316 of the operating system (OS) 312. In some embodiments, the environment sourcing application 304 prevents the script shell 308 from terminating until after the environment retrieval module 332 retrieves the new environment definition information generated by the environment script 310 from computing environment 316 of the operating system (OS) 312. Once the script shell 308 terminates, the computing system 300 returns to operating under the target shell 302, which causes the computing environment 316 to automatically return to the original computing environment 318. However, in the illustrated embodiment, the user intends to operate the computing system 300 in an environment as created by the environment script 310. Therefore, the environment comparison module 334 will determine how the new computing environment 322 created by the environment script 310 differs from the original computing environment 318, and the variable adjustment module 338 will use the results of this comparison to return the variables and settings of the computing environment 316 to match those created by the environment script 310.

In some embodiments, the environment comparison module 334 compares the modified environment data 336 stored in memory 326 to the original environment data 328 stored in memory 326 to derive characteristics of the new computing environment 322 created by the environment script 310 that differ from the original computing environment. In some embodiments, the environment comparison module 334 iterates through all key:value pairs in both the new and old environments to detect how the new environment created by the environment script 310 differs from the original computing environment. For example, in some embodiments that store key:value pairs as original and new environment arrays, the environment comparison module 334 iterates through all key:value pairs in the original and new environment arrays to detect how the new environment created by the environment script 310 differs from the original computing environment.

In some embodiments, the variable adjustment module 338 receives comparison results from the environment comparison module 334, where the comparison results includes information regarding how the new computing environment 322 created by the environment script 310 differed from the original (and current) computing environment 318. The variable adjustment module 338 makes changes to the computing environment 316 as needed to revert the computing environment 316 back to the to the new computing environment 322 based on the comparison results from the environment comparison module 334. For example, in some embodiments, the variable adjustment module 338 denotes variables that were deleted by the environment script 310 and denotes variables that were modified or added by the environment script 310. In some embodiments, the variable adjustment module 338 uses this information to revise the current computing environment 316 to match the new computing environment 322. For example, in some embodiments, if a key:value pair in the original computing environment 318 is not in the new computing environment 322, the variable adjustment module 338 unsets the key:value pair. If a key:value pair in the new computing environment 322 is not in the original computing environment 318, the key:value pair is exported from the modified environment data 336 and is inserted into the computing environment 316. Thus, the variable adjustment module 338 unsets all deleted variables in the syntax of the target shell, and sets all modified or added variables in the syntax of the target shell, as needed to return the computing environment 316 to the new computing environment 322. In some embodiments, the variable adjustment module 338 will perform other tasks from the environment script 310, for example moving or removing a file.

In some embodiments, the environment sourcing application 304 allows for nested scenarios that allow for more than one language change between the target shell 302 and the environment script 310. In the illustrated embodiment, a user can source a script 310' inside of a script shell 308', which in turn sources the environment script 310 inside another script shell 308, where the target shell 302, script shell 308', and script shell 308 are different types of shells. For example, in an embodiment, the script shell 308 is a C shell and the environment script 310 is a C shell script, the script shell 308' is a korn shell and the environment script 310' is a korn shell script, and the target shell is a bash shell. Still further embodiments include three more levels of translation. In some embodiments, the processes performed by the environment retrieval module 332, environment comparison module 334, and variable adjustment module 338 are repeated for each stage of translation. For example, when the script shell 308 terminates, the processes described above by the environment retrieval module 332, environment comparison module 334, and variable adjustment module 338 are performed to emulate the environment created by the environment script 310 under the script shell 308', and then the processes described above by the environment retrieval module 332, environment comparison module 334, and variable adjustment module 338 are performed again to emulate the environment created by the environment script 310 under the target shell 302.

Figure 4:
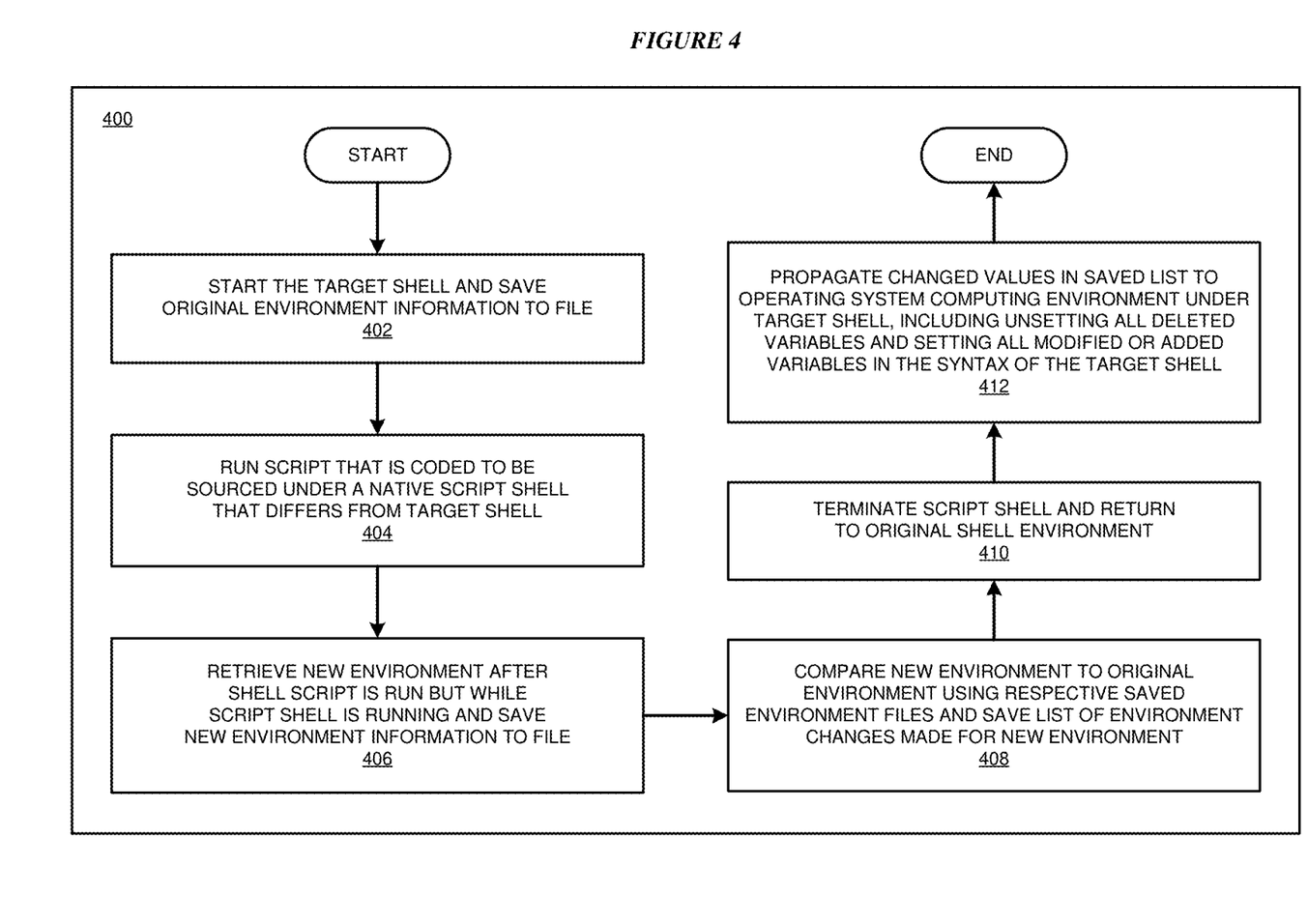
FIG. 4 depicts a flowchart of an example process for emulating an environment set by a source script written in a different scripting language in accordance with an illustrative embodiment.

With reference to FIG. 4 this figure depicts a flowchart of an example process 400 for emulating an environment set by a source script written in a different scripting language in accordance with an illustrative embodiment. In a particular embodiment, the environment sourcing application 304 carries out the process 400.

In an embodiment, at block 402, the process starts a target shell and saves original computing environment information to a file. In some embodiments, the process retrieves current environment definition information from the current computing environment information associated with the operating system, and stores the current environment definition information as original environment data in a computer memory. In some embodiments, original environment data includes data that defines an original computing environment associated with the target command shell. In some embodiments, the original computing environment is a default environment initiated by the operating system, for example when the operating system is starting up or when a user logs in. In some embodiments, the original environment data includes various environment variables and options as key:value pairs that are available to applications running under the operating system, for example, information about the types and locations of system resources; the state of the runtime environment; the operating system and other software; and user settings. In some embodiments, the process stores the original environment definition information in a text file in a computer memory. For example, in some embodiments, the process is running on a UNIX or Linux operating system and stores environment definition information that is output from the shell command env( ) in a text file in a computer memory. In some embodiments, the process copies key:value pairs from the environment definition information and stores them in an original environment array, for example in a hash table, in a computer memory.

Next, at block 404, the process runs a script that is coded to be sourced under a native script shell that differs from the target shell. In some embodiments, the script is an environment script that includes instructions for changing at least one aspect of the computing environment, thereby creating a new computing environment. For example, in some embodiments, the process runs an environment script that is written in a scripting language that is not compatible with the target shell, and therefore needs to be sourced under the script's native shell, which is a different type of shell from the target shell. As a non-limiting example, in some embodiments, the target shell is a bash shell, whereas the environment script is written to be run through a C shell, so the script shell is a C shell. In some embodiments, the process launches the script shell as a child command shell and executes the environment script in the child command shell. In some embodiments, the process runs an environment script that sets environment variables, modifies files and/or folders, and may perform other actions that create a new computing environment.

Next, at block 406, the process retrieves information regarding the new computing environment after the environment script has completed its changes to the computing environment, but while the script shell is still running, and saves the new computing environment information to a file. For example, in some embodiments, the process retrieves the new environment definition information for the new computing environment generated by the environment script from computing environment associated with the operating system, and stores the new environment definition information in a computer memory. In some embodiments, the modified environment data includes various environment variables and options as key:value pairs that are available to applications running under the operating system, for example, information about the types and locations of system resources; the state of the runtime environment; the operating system and other software; and user settings. In some embodiments, the process stores the new environment definition information in a text file in a computer memory. For example, in some embodiments, the process is running on a UNIX or Linux operating system and stores environment definition information that is output from the shell command env( ) in a text file in a computer memory. In some embodiments, the process copies key:value pairs from the new environment definition information and stores them in a new environment array, for example in a hash table, in a computer memory.

Next, at block 408, the process compares the new computing environment to the original computing environment using respective saved environment files and saves a list of environment changes made for the new computing environment. For example, in some embodiments, the process compares the modified environment data stored in computer memory to the original environment data stored in computer memory to derive characteristics of the new computing environment created by the environment script that differ from the original computing environment. In some embodiments, the process iterates through all key:value pairs in both the new and old environments to detect how the new environment created by the environment script differs from the original computing environment. For example, in some embodiments that store key:value pairs as original and new environment arrays, the process iterates through all key:value pairs in the original and new environment arrays to detect how the new environment created by the environment script differs from the original computing environment.

Next, at block 410, the process terminates the script shell, causing the process to return to the target shell and to the original computing environment. In some embodiments, the script shell is terminated at any point after the process retrieves the new environment definition information generated by the environment script from the computing environment of the operating system. In some embodiments, the process prevents the script shell from terminating until after the process retrieves the new environment definition information generated by the environment script from the computing environment of the operating system. Once the script shell terminates, the computing system returns to operating under the target shell, which causes the computing environment to automatically return to the original computing environment associated with the target shell. However, in the illustrated embodiment, the user intends to operate the computing system in an environment as created by the environment script. Therefore, the process will determine how the new computing environment created by the environment script differs from the original computing environment, and the process will use the results of this comparison to return the variables and settings of the computing environment to match those created by the environment script.

Next, at block 412, the process propagates the changed values in the saved list to the operating system computing environment under the target shell. In some embodiments, the process uses the comparison results from block 408 that include information regarding how the new computing environment created by the environment script differed from the original (and current) computing environment. The process makes changes to the computing environment as needed to revert the computing environment back to the to the new computing environment based on the comparison results. For example, in some embodiments, the process denotes variables that were deleted by the environment script and denotes variables that were modified or added by the environment script. In some embodiments, the process uses this information to revise the current computing environment to match the new computing environment. For example, in some embodiments, if a key:value pair in the original computing environment is not in the new computing environment, the process unsets the key:value pair. If a key:value pair in the new computing environment is not in the original computing environment, the key:value pair is exported from the computer memory and inserted into the computing environment. Thus, the process unsets all deleted variables in the syntax of the target shell, and sets all modified or added variables in the syntax of the target shell, as needed to return the computing environment to the new computing environment. In some embodiments, the process will perform other tasks from the environment script, for example moving or removing a file.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   storing original environment data in a memory of a computing device, the original environment data defining an original computing environment associated with a target command shell;
   executing a script in a child command shell that includes an environment variable set-up command for setting an environmental characteristic of a new computing environment associated with the child command shell;
   storing new environment data in the memory of the computing device, the new environment data defining the new computing environment associated with the child command shell;
   restoring the original computing environment by terminating the child command shell and returning to the target command shell;
   generating new data representative of comparison results from comparing the original environment data to the new environment data to derive characteristics of the new computing environment that differ from the original computing environment; and modifying the original computing environment to include the characteristics of the new computing environment that differ from the original computing environment.

2. The method of claim 1, further comprising executing a command in the target command shell that launches the child command shell.

3. The method of claim 2, wherein the executing of the command in the target command shell comprises sourcing the child command shell.

4. The method of claim 1, wherein the target command shell and child command shell are different types of shells.

5. The method of claim 1, wherein the storing of the original environment data in the memory of the computing device comprises storing a first array of key:value pairs of original environment variables.

6. The method of claim 5, wherein the storing of the new environment data in the memory of the computing device comprises storing a second array of key:value pairs of new environment variables.

7. The method of claim 6, wherein the generating of the new data representative of comparison results comprises iterating through key:value pairs in the first and second arrays to detect how the new computing environment differs from the original computing environment.

8. The method of claim 1, wherein the modifying of the original computing environment to include the characteristics of the new computing environment includes unsetting a key:value pair from the original environment that is not in the new environment data.

9. The method of claim 1, wherein the modifying of the original computing environment to include the characteristics of the new computing environment includes exporting a key:value pair from the new environment data that is not in the original environment data.

10. The method of claim 1, wherein the modifying of the original computing environment to include the characteristics of the new computing environment includes exporting a key:value pair from the new environment data that has a value that is different from that of the original environment data.

11. The method of claim 1, wherein the modifying of the original computing environment to include the characteristics of the new computing environment includes deleting a file.

12. A computer usable program product comprising one or more computer readable storage media, and program instructions collectively stored on the one or more computer readable storage media, the program instructions executable by controller circuitry to cause the controller circuitry to perform operations comprising:

storing original environment data in a memory of a computing device, the original environment data defining an original computing environment associated with a target command shell;

executing a script in a child command shell that includes an environment variable set-up command for setting an environmental characteristic of a new computing environment associated with the child command shell;

storing new environment data in the memory of the computing device, the new environment data defining the new computing environment associated with the child command shell;

restoring the original computing environment by terminating the child command shell and returning to the target command shell;

generating new data representative of comparison results from comparing the original environment data to the new environment data to derive characteristics of the new computing environment that differ from the original computing environment; and modifying the original computing environment to include the characteristics of the new computing environment that differ from the original computing environment.

13. The computer usable program product of claim 12, wherein the stored program instructions are stored in a computer readable storage device in a data processing system, and wherein the stored program instructions are transferred over a network from a remote data processing system.

14. The computer usable program product of claim 12, wherein the stored program instructions are stored in a computer readable storage device in a server data processing system, and wherein the stored program instructions are downloaded over a network to a remote data processing system for use in the computer readable storage device associated with the remote data processing system, further comprising:

program instructions to meter use of the stored program instructions; and program instructions to generate an invoice based on the metered use.

15. The computer usable program product of claim 12, further comprising executing a command in the target command shell that launches the child command shell, wherein the executing of the command in the target command shell comprises sourcing the child command shell.

16. The computer usable program product of claim 12, wherein the target command shell and child command shell are different types of shells.

17. The computer usable program product of claim 12, wherein the storing of the original environment data in the memory of the computing device comprises storing a first array of key:value pairs of original environment variables and storing a second array of key:value pairs of new environment variables, and wherein the generating of the new data representative of comparison results comprises iterating through key:value pairs in the first and second arrays to detect how the new computing environment differs from the original computing environment.

18. A computer system comprising a processor and one or more computer readable storage media, and program instructions collectively stored on the one or more computer readable storage media, the program instructions executable by the processor to cause the processor to perform operations comprising:

storing original environment data in a memory of a computing device, the original environment data defining an original computing environment associated with a target command shell;

executing a script in a child command shell that includes an environment variable set-up command for setting an environmental characteristic of a new computing environment associated with the child command shell;

storing new environment data in the memory of the computing device, the new environment data defining the new computing environment associated with the child command shell;

restoring the original computing environment by terminating the child command shell and returning to the target command shell;

generating new data representative of comparison results from comparing the original environment data to the new environment data to derive characteristics of the new computing environment that differ from the original computing environment; and modifying the original computing environment to include the characteristics of the new computing environment that differ from the original computing environment.

19. The computer system of claim 18, further comprising executing a command in the target command shell that launches the child command shell, wherein the executing of the command in the target command shell comprises sourcing the child command shell.

20. The computer system of claim 18, wherein the storing of the original environment data in the memory of the computing device comprises storing a first array of key:value pairs of original environment variables and storing a second array of key:value pairs of new environment variables, and wherein the generating of the new data representative of comparison results comprises iterating through key:value pairs in the first and second arrays to detect how the new computing environment differs from the original computing environment.

\* \* \* \* \*